United States Patent
Kuchii et al.

(10) Patent No.: US 7,239,336 B2
(45) Date of Patent: Jul. 3, 2007

(54) IMAGE EXPOSING APPARATUS HAVING A BEAM SCANNER

(75) Inventors: Takafumi Kuchii, Wakayama (JP); Hirofumi Hayashi, Wakayama (JP); Tomoyuki Ishii, Wakayama (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 746 days.

(21) Appl. No.: 10/323,415

(22) Filed: Dec. 19, 2002

(65) Prior Publication Data

US 2003/0123109 A1    Jul. 3, 2003

(30) Foreign Application Priority Data

Dec. 27, 2001   (JP) .............................. 2001-395795

(51) Int. Cl.
*B41J 2/435*   (2006.01)
(52) U.S. Cl. ...................................... 347/236; 347/246
(58) Field of Classification Search ........ 347/130–133, 347/135, 234–239, 246–255; 372/38.01–38.02, 372/38.07, 29.01–29.02
See application file for complete search history.

(56) References Cited

U.S. PATENT DOCUMENTS

| | | | |
|---|---|---|---|
| 4,796,265 A | 1/1989 | Asada et al. | |
| 5,745,152 A | 4/1998 | Vincent et al. | |
| 5,973,719 A | 10/1999 | Araki et al. | |
| 6,021,144 A * | 2/2000 | Meyer et al. | 372/38.02 |
| 6,069,645 A | 5/2000 | Vincent | |
| 6,259,466 B1 * | 7/2001 | Oomura et al. | 347/237 |
| 6,347,105 B1 * | 2/2002 | Nakayama et al. | 372/38.07 |
| 2001/0052925 A1 | 12/2001 | Ikeda | |

FOREIGN PATENT DOCUMENTS

| | | |
|---|---|---|
| EP | 0 710 005 | 5/1996 |
| EP | 1 111 903 A | 6/2001 |
| JP | 06054133 A * | 2/1994 |

* cited by examiner

*Primary Examiner*—Hai Pham
(74) *Attorney, Agent, or Firm*—Fulbright & Jaworski L.L.P.

(57) ABSTRACT

An image exposing apparatus forms an image on photosensitive material by the technique of exposing and forming an image through direct modulation of a semiconductor laser device. The exposing apparatus includes a beam scanning unit for scanning a beam emitted from a semiconductor laser device to photosensitive material, a laser driving unit for driving the semiconductor laser device, the laser driving unit being operable to vary its driving current to the semiconductor laser device in accordance with a received image signal, and a laser output controller operable to measure current-beam output characteristics of the semiconductor laser device over a predetermined current range and then set a correlation between the image signal for the laser driving unit and the driving current for the semiconductor laser device, based on the measurement information.

8 Claims, 6 Drawing Sheets

IMAGE EXPOSING APPARATUS HAVING A BEAM SCANNER

BACKGROUND OF THE INVENTION

1. Field of the Invention

The present invention relates to an image exposing apparatus including a beam scanning means for scanning a beam emitted from a semiconductor laser device to photosensitive material and laser driving means for driving the semiconductor laser device, the laser driving means being operable to vary its driving current to the semiconductor laser device in accordance with a received image signal.

2. Description of the Related Art

Such image exposing apparatus of the above-noted type is used for scanning photosensitive material with optical beam thereby to form a desired image on the photosensitive material.

The apparatus employs a semiconductor laser device for generating the optical beam. As the beam outputted from the semiconductor laser device can be modulated directly by its driving current, any desired image can be formed on the photosensitive material by varying the driving current for the semiconductor laser device according to an image signal inputted thereto.

Therefore, in order to expose photosensitive material with a desired exposure amount, it is necessary to control the beam output from the semiconductor laser device. As a method of controlling this, the conventional art noted fact that an oscillation threshold current of the semiconductor laser device varies with time and hence proposes a construction wherein the oscillation threshold current of the semiconductor laser device is measured at an appropriate timing and then to this measured oscillation threshold current value, a current value corresponding to a target beam output is added, thereby to obtain a driving current to be applied to the semiconductor laser device.

However, when the above-described conventional construction was applied to the device for exposure-forming an image through direct modulation of the beam output of the semiconductor laser device, there was often observed a phenomenon that the resultant exposed image would exhibit disadvantageous change in its "coloring" with time. In this respect, there has been a need for improvement.

The present invention has been made in view of the above-described state of the art. The principal object of the invention is to ensure, for an extended period of time, good quality in images to be obtained on the photosensitive material by the technique of exposing and forming an image through direct modulation of the semiconductor laser device.

SUMMARY OF THE INVENTION

For accomplishing the above-noted object, an image exposing apparatus, according to the present invention, comprises:

beam scanning means for scanning a beam emitted from a semiconductor laser device to photosensitive material;

laser driving means for driving the semiconductor laser device, the laser driving means being operable to vary its driving current to the semiconductor laser device in accordance with a received image signal; and laser output controlling means operable to measure current-beam output characteristics of the semiconductor laser device over a predetermined current range and then set a correlation between said image signal for the laser driving means and the driving current for the semiconductor laser device, based on the measurement information.

Namely, the present inventors discovered, through extensive and intensive research efforts, that such time change or deterioration in the image quality which would occur with the above-described type of construction adapted for exposure image formation through direct modulation of the semiconductor laser device is attributable to the fact that the slope (so-called "differential efficiency") of the portion in the current-beam output characteristics of the semiconductor laser device beyond the threshold current varies according to e.g. ambience temperature and/or "aging" deterioration of the semiconductor laser device per se.

Based on the above discovery, the present inventors reasoned as follows. When an exposure image is formed through direct modulation of the semiconductor laser device, in order to achieve uniform or non-varying image quality ensured for an extended period of time, as factors which may be involved in leading to characteristics time change in the semiconductor laser device, it is insufficient to address to the single factor, i.e. its oscillation threshold current alone. Rather, its current-beam output characteristics should be measured over a certain range of current dependent on the use condition of the device and it should be effective if the correlation between the input image signal and the driving current for the laser device should be appropriately set, based on the data obtained from such "extended" measurement, so as to control the beam output from the semiconductor laser device. In fact, the present inventors conducted an experiment for an extended period of time, using this control scheme for controlling the beam output from the semiconductor laser device and found that this novel control scheme can appropriately "follow" or "cope with" such time change in the characteristics of the semiconductor laser device, thereby to achieve significant improvement in the quality of the image formed by the device.

In addition to the above-described construction, preferably, the apparatus further comprises beam-position detecting means for detecting the beam being scanning a position other than a position where the image is to be formed by exposure; and based on detection information from said beam-position detecting means, said laser output controlling means measures the current-beam output characteristics of the semiconductor laser device over the predetermined current range dependent on the use condition of the device and then sets the correlation between said image signal received by the laser driving means and the driving current for the semiconductor laser device.

The setting operation of the correlation between the inputted image signal and the driving current for the semiconductor laser device could be effected while the beam from the semiconductor laser device is engaged in exposing the photosensitive material. However, in order to effect this setting operation without adversely affecting the quality of the image being exposed, it is necessary to execute a sophisticated control operation at a high speed, for which a complicated or sophisticated apparatus would be required. Then, the present invention proposes to effect this setting operation of the correlation between the received image signal and the driving current while the beam is scanning a position other than such position where the image is to be formed by exposure. With this, the correlation setting operation may be carried out without adversely affecting the quality of the image being exposed and without requiring undue sophistication of the apparatus also.

Preferably, said laser driving means includes a multiplier circuit for multiplying an input value of the inputted image signal by a primary coefficient and an adder circuit for adding a constant to its product (i.e. the result of the multiplication operation);

Wherein said laser output controlling means includes a constant feedback controlling circuit for varying said constant in such a manner as to cause the beam output from the semiconductor laser device to correspond to a zero level signal input to said adder circuit and a primary coefficient feedback controlling circuit for varying said primary coefficient in such a manner as to cause the beam output from the semiconductor laser device to correspond to a beam output adjusting signal level signal input to said multiplier circuit; and wherein said laser output controlling means determines said constant by energizing said constant feedback controlling circuit when the input to said adder circuit is set to said zero level signal input and determines said primary coefficient by energizing said primary coefficient feedback controlling circuit when the input to the multiplier circuit is set to the beam output adjusting signal level signal input, thereby to effect said measurement of the current-beam output characteristics of the semiconductor laser device in parallel with said setting operation of the correlation between the received image signal of the laser driving means and the driving current for the semiconductor laser device.

That is to say, the current-beam output characteristics of the semiconductor laser device has good linearity (i.e. represented substantially by a straight line) at a portion thereof exceeding the threshold current. Then, when the semiconductor laser device is directly modulated by the input image signal, this image signal is multiplied by the primary coefficient at the multiplier circuit and the resultant product is added with the constant at the adder circuit, whereby the beam output from the semiconductor laser device may be varied according to the input image signal.

With the above-described construction of the laser driving means for driving the semiconductor laser device, by setting the primary coefficient and the constant in accordance with the current-beam output characteristics and time change thereof for each semiconductor laser device (each for one of color components), it becomes possible to obtain greater stability in the color density of the image and therefore higher quality thereof, regardless of any change which may occur with lapse of time in the current-beam output characteristics of the semiconductor laser device.

More particularly, the primary coefficient feedback controlling circuit and the constant feedback controlling circuit are provided for the purpose of setting the primary coefficient and the constant in correspondence with the current-beam output characteristics of each semiconductor laser actually employed. In operation, with the input to the adder circuit being set to the zero level signal input, the constant feedback controlling circuit is energized for determining the constant. Thereafter, with the input to the multiplier circuit being set to the beam output adjusting signal level signal input, the primary coefficient feedback controlling circuit is energized for setting the primary coefficient. This is an operation in which for the two levels of beam outputs therefrom, i.e. one beam output level corresponding to the zero level signal input and the other beam output level corresponding to the input signal of the beam output adjusting signal level, the driving currents for the semiconductor laser device for obtaining such beam output levels are measured by way of setting the primary coefficient and the constant. And, at the same time, this operation serves to set the correlation between the input image signal for the laser driving means and the driving current for the semiconductor laser device. In this way, the setting operation of the correlation between the input image signal to the laser driving means and the driving current for the semiconductor laser device may be carried out very speedily and accurately.

Incidentally, the adder circuit and the multiplier circuit may be of a variety of circuit formats. Hence, in the context of this disclosure, the terms "multiplier circuit" and "adder circuit" are intended to generically refer to any such circuits capable of multiplication and addition of signals, respectively.

Further, the laser driving means may be adapted for superimposing a high-frequency signal on the driving current for the semiconductor laser device.

Namely, through the extensive and intensive research efforts, the present inventors further discovered that when the semiconductor laser device is directly modulated by the input image signal thereto, variation occurring in its beam output and oscillation wavelength due to the so-called "mode hopping" phenomenon in the semiconductor laser device may aversely affect the quality of the exposed image.

Then, according to the image exposing apparatus of the invention, by superposing a high-frequency signal on the driving circuit for the semiconductor laser device, such disadvantageous variation in the beam output and/or oscillation wavelength due to the mode-hopping phenomenon is effectively restricted. As a result, the image quality has been further improved.

Further, in the above-described construction, the laser driving means may superimpose said high-frequency signal by varying the primary coefficient to be inputted to the multiplier circuit or the constant to be inputted to the adder circuit. Namely, the superimposing operation of a high-frequency signal on the driving current for the semiconductor laser device may be realized by providing a special circuit for imposing the high-frequency signal, separately from the laser driving means construction. However, this is also possible by utilizing the primary coefficient or the constant which governs the operation of the laser driving means. With the latter construction, such additional circuit dedicated for high-frequency signal superimposition may be eliminated, thereby to contribute to further simplification of the entire apparatus construction.

Further and other objects and advantages of the invention will become apparent upon reading the following detailed description of the preferred embodiments with reference to the accompanying drawings.

DESCRIPTION OF THE PREFERRED EMBODIMENT

A preferred embodiment of an image exposing apparatus relating to the present invention as incorporated in a photographic printing system DP will be described in details with reference to the accompanying drawings.

Figure 4:
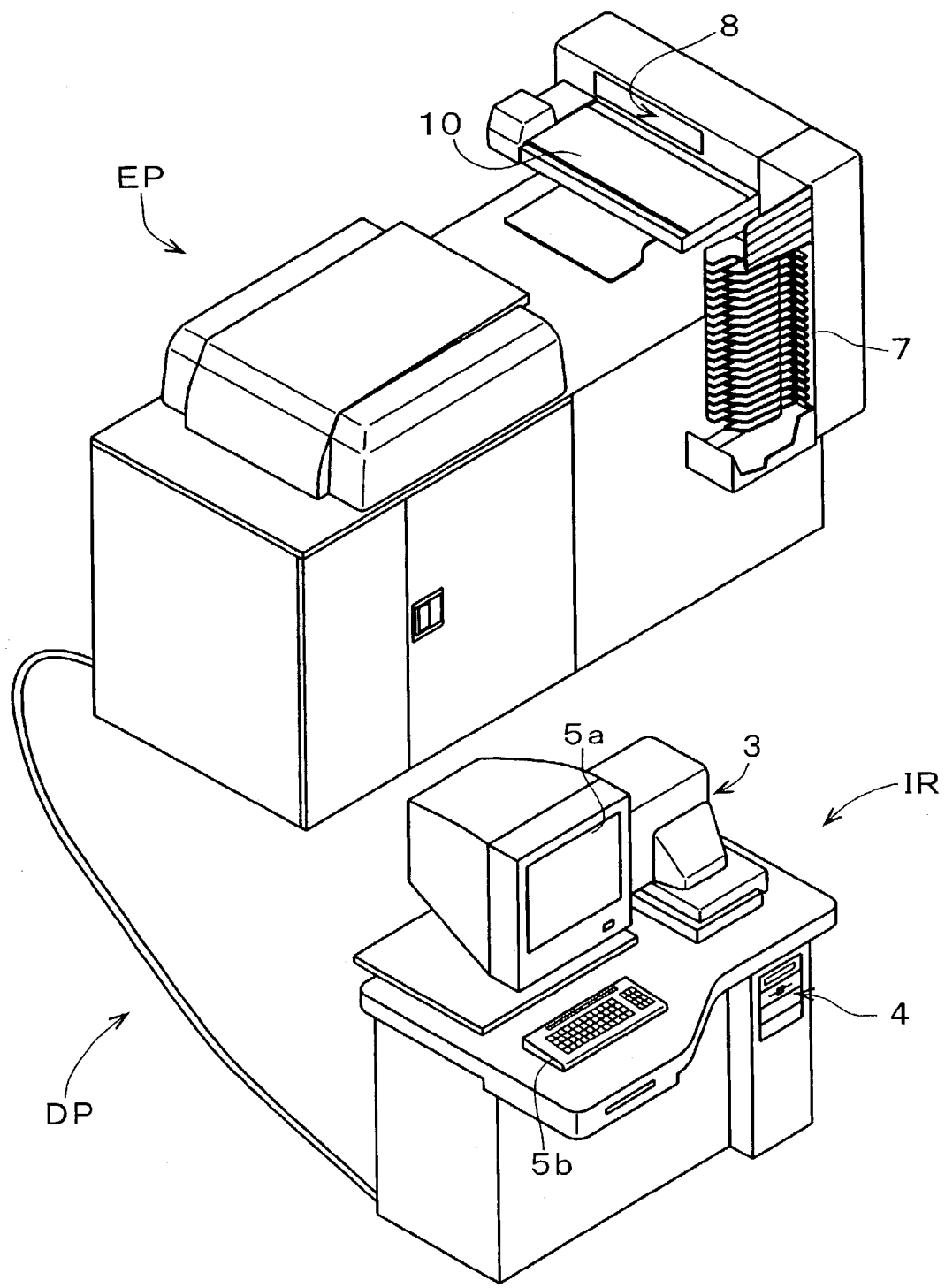
FIG. 4 is a perspective view showing an appearance of the photographic printing system according to the one embodiment of the invention.

The photographic printing system DP illustrated in this embodiment is known as "digital mini-lab" As shown in FIG. 4, the system consists mainly of an image input apparatus IR for inputting image data for producing photographic prints therefrom from a conventional developed photographic film or from an electronic recording medium such as a memory card, MO, CD-R, etc and of an exposing/developing apparatus EP for exposing the image data inputted from the image input apparatus ER onto a print paper 2 which is an example of a photosensitive material PS.

[Schematic Construction of Image Input Apparatus IR]

Figure 3:
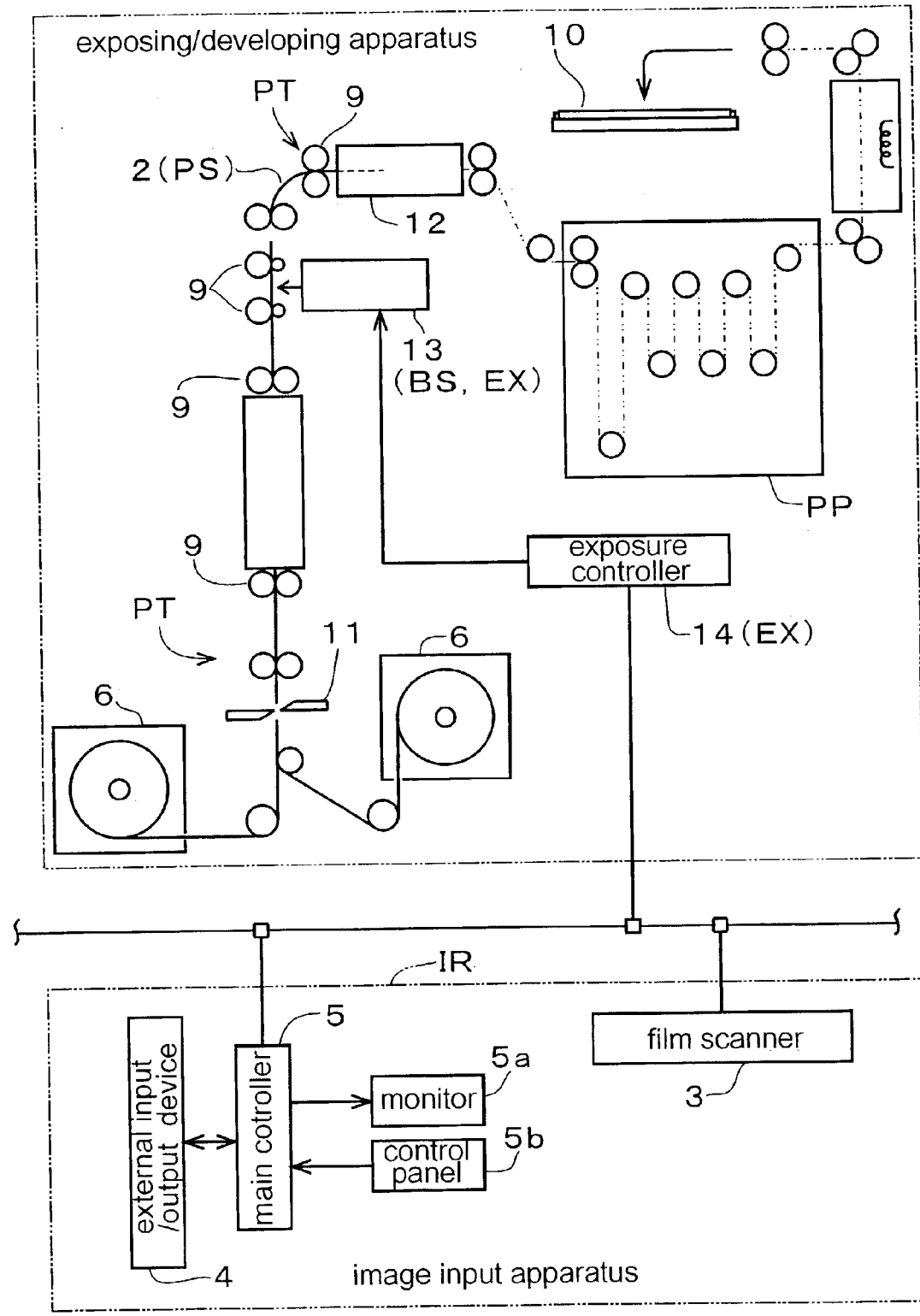
FIG. 3 is a block diagram of a photographic printing system relating to the one embodiment of the invention.

As shown in the schematic of FIG. 3, the image input apparatus IR includes a film scanner 3 for reading frame images of a photographic film (not shown) and converting them into electronic data, an external input/output device 4 including an MO drive, CD-R drive, etc., and a main controller 5 comprising a general-purpose small computer system for controlling the film scanner 3 and the external input/output device 4 and controlling also the entire photographic printing system DP. Further, the main controller 5 is connected to a monitor 5a for displaying a simulation image comprising a simulated image of a finish print to be obtained and displaying also various information needed for control and to a control panel 5b for allowing manual setting of various exposure conditions and input operations of the various other control information.

[General Construction of Exposing/Developing Apparatus EP]

As also shown in the schematic of FIG. 3, the exposing/developing apparatus EP includes, within its housing, an image exposing device EX, a developing device PP for developing the print paper 2 exposed by the image exposing device EX, a print paper magazine 6 storing therein the print paper 2 in the form of a roll, a print paper transporting mechanism PT for transporting a length of the print paper 2 withdrawn from the magazine 6 first to the image exposing device EX and then to the developing device PP by means of a plurality of transport rollers 9 and the like.

Outside the housing of the exposing/developing apparatus EP, there are arranged a sorter 7 for sorting each print paper (or paper strip) developed and then dried at the developing device PP according to the customer's order and a conveyer 10 for conveying the print paper 2 discharged from a discharge opening 8 to the sorter 7.

Further, the print paper transporting mechanism PT incorporates, along its transport path, a cutter 11 for cutting the length of print paper 2 drawn out of the print paper magazine 6 into pieces of predetermined size(s) and a distributor 12 for distributing the print paper pieces 2 being transported in a row to a plurality of transport lines.

[Construction of Image Exposing Apparatus EX]

The image exposing apparatus EX consists mainly of an image exposing unit 13 as a beam scanning means BS for scanning optical beam on the print paper 2 for forming a latent image on the paper 2 and an exposure controller 14 for controlling the image exposing unit 13.

[Construction of the Image Exposing Unit 13]

The image exposing unit 13 is of laser exposure type for exposing an image on the print paper 2 with using laser bam as the beam source. The schematic construction of this unit 13 is shown in a block diagram of FIG. 1.

The image exposing unit 13 includes a red laser source 20r, a green laser source 20g and a blue laser source 20b for emitting monochrome beams of red, green and blue as collimate beams, respectively, acousto-optic modulating (AOM) elements 21 for modulating intensities of the beams emitted from the green laser source 20g and the blue laser beam 20b respectively, beam expanders 22 for adjusting diameters of the beams LB emitted from the respective laser sources 20r, 20g, 20b, cylindrical lenses 23, a prism 24 for collecting the three beams LB of red, green and blue on a single optical path, a polygonal mirror 25 for scanning the single combined laser beam LB on the print paper 2, and an assembly of focusing lenses 26 having certain f-θ characteristics as well as an accessory function for offsetting any angular deviation if any in the plane of respective reflecting face of the polygonal mirror. The unit 13 further includes mirrors 27 for refracting the respective paths of the optical beams LB, apertures 28 for restricting the beams to enter the prism 24, and a beam sensor 19 for detecting that the beam LB is irradiated at a predetermined position (reference position) within a scanning range.

At one extreme end of the scanning range of the beam LB scanned by the polygonal mirror 25, there is provided a detection mirror 18. In operation, the beam LB exiting the focusing lens assembly 26 and then reflected by the detection mirror 18 is detected by the beam sensor 19, which then outputs a pulse signal indicative of the detection of the beam LB. The detection mirror 18 is disposed at a position away from or out of an area where the print paper 2 is normally assumed to be present.

The output (pulse) signal from the beam sensor 19 is utilized not only for detecting of a timing for initiating transmission of image signals for one line amount of image signals, but also for detecting that the beam LB is scanning a position other than the positions where the image is formed by exposure. Therefore, the beam sensor 19 and the detection mirror 18 associated therewith together function as a beam-position detecting means BP for detecting the beam LB is scanning a position other than the positions where the image is formed by exposure.

[Construction of Red Laser Source 20r]

As described above, unlike the green laser source 20g and the blue laser source 20b, the red laser source 20r does not have the AOM element 21 associated therewith. That is to say, the green laser source 20g and the blue laser source 20b are of externally modulated type, whereas the red laser source 20r is directly modulated type.

The construction of this red laser source 20r will be described in further details next, with reference to the schematic block diagram of FIG. 2. The red laser source 20r includes a laser unit 42 incorporating within a single package a semiconductor laser device 40 and a photodiode 41 for monitoring the beam output from the semiconductor laser device 40, a collimate lens 43, a laser driving circuit 44 as a laser driving means LD for supplying a driving current to the semiconductor laser device 40, and a beam output controlling circuit 45 as a laser output controlling means LC.

The laser driving circuit 44 includes a multiplier 50 for converting an image signal inputted thereto into a driving current value for the semiconductor laser device 40 in such a manner that this semiconductor laser device 40 may emit a laser beam of a certain beam output value corresponding to the red image signal received from the exposure controller 14, and a high-frequency oscillator circuit 51 for superimposing a high-frequency signal on the driving current for the semiconductor laser device 40.

The adder 50 provides a function for outputting, as the driving current for the semiconductor laser device 40, a result Y of calculation of a linear equation: Y=A*X+B for an input image signal X. Specifically, this multiplier 50 integrally comprises a multiplier circuit 50a for multiplying the input image signal X by a primary coefficient A, an adder circuit 50b for adding a constant B to the product of the multiplication and a current outputting circuit 50c for outputting a current corresponding to the output (sum) from the adder circuit 50b. In the following discussion, if needed or appropriate, the input terminal of the multiplier circuit 50a for inputting the image signal will be referred to as X input; the input terminal of the multiplier circuit 50a for inputting the primary coefficient A will be referred to as A input; and the input terminal of the adder circuit 50b for inputting the constant B will be referred to as B input, respectively.

Figure 6:
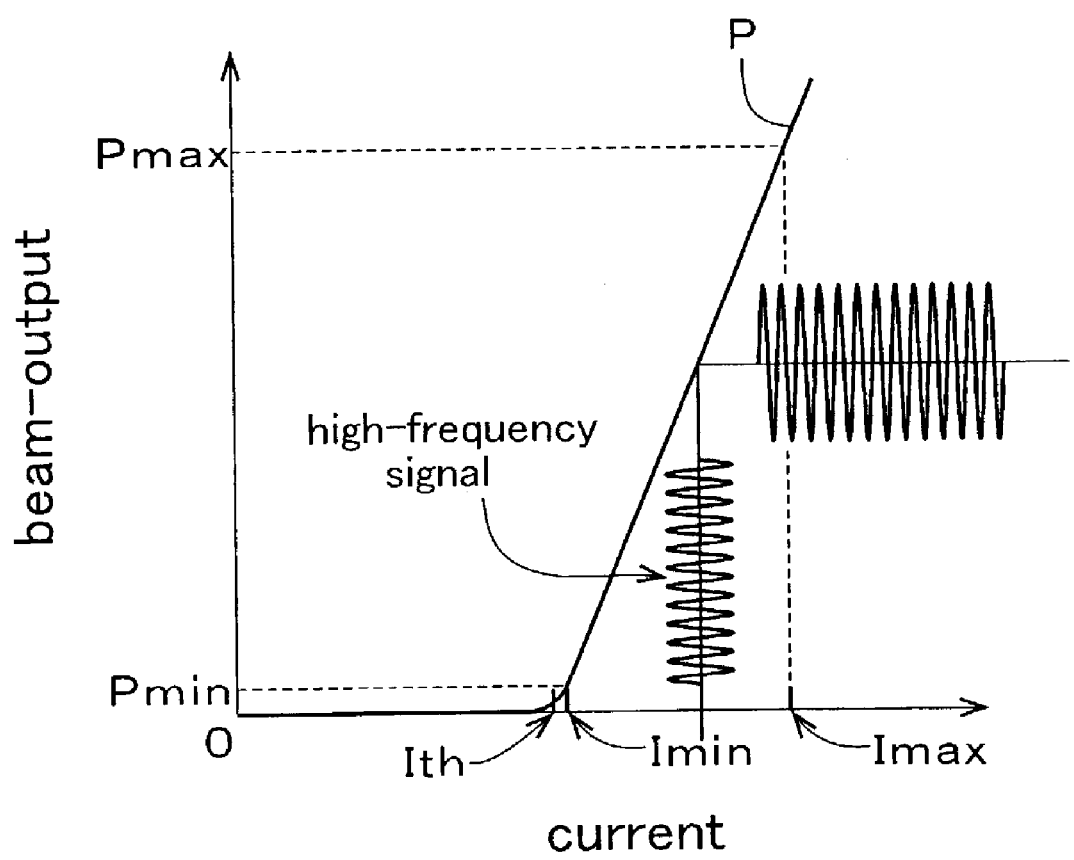
FIG. 6 is a graph illustrating characteristics of a semiconductor laser device relating to the one embodiment of the invention.

The semiconductor laser device 40 exhibits output characteristics represented substantially by a solid line P in FIG. 6. Therefore, if the constant B for the linear equation described above is set to a value (voltage) exceeding an oscillation threshold value current Ith of this semiconductor laser device 40, then, it becomes possible to vary the beam output from the semiconductor laser device 40 according to the input image signal X, by utilizing the linear portion of the current-beam output characteristics of the laser device 40.

Incidentally, the above-described oscillation threshold value current Ith and the slope of the portion of the current-beam output characteristics curve (i.e. so-called "differential efficiency") above the oscillation threshold value current Ith vary for each particular semiconductor laser device 40 employed. Further, even for a same device, these values tend to vary with lapse of time due to "aging" deterioration of the device per se and/or to the ambience temperature. In this respect, according to the image exposing apparatus of the present invention, the beam output controlling circuit 45 carries out a control operation for appropriately varying the primary coefficient A and the constant B to accommodate or in accordance with such characteristics difference and change of the characteristics with time. That is to say, this beam output controlling circuit 45 acting as laser output controlling means LC has, as basic functions thereof, the function of measuring the current-beam output characteristics of the semiconductor laser device 40 over a predetermined current range and the further function of setting, based on this measurement information, the correlation between the input image signal for the laser driving circuit 44 and the driving circuit for the semiconductor laser device 40.

More particularly, the beam output controlling circuit 45 includes a constant feedback controlling circuit 52 for inputting the constant B to the B input of the adder circuit 50b and a primary coefficient feedback controlling circuit 53 for inputting the primary coefficient A to the A input of the multiplier circuit 50a, thereby to provide these two functions in parallel with each other.

Figure 2:
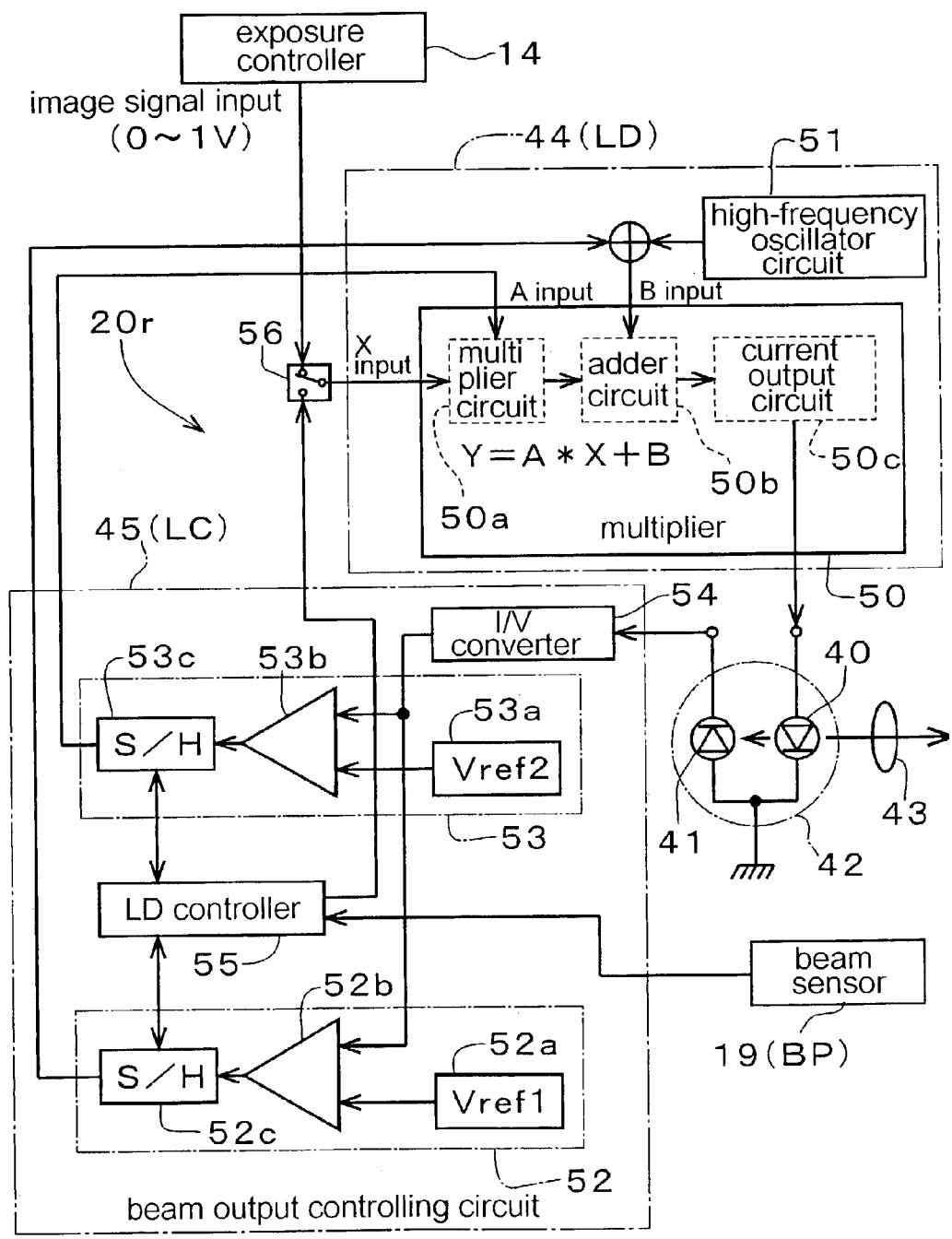
FIG. 2 is a block diagram of a red laser beam source relating to the one embodiment of the invention.

As shown in FIG. 2, in addition to the above-described constant feedback controlling circuit 52 and primary coefficient feedback controlling circuit 53, the beam output controlling circuit 45 further includes an I/V converter circuit 54 for converting an output current from the photodiode 41 into a voltage, and an LD controller 55 for controlling operation timings of the constant feedback controlling circuit 52 and the primary coefficient feedback controlling circuit 53.

The constant feedback controlling circuit 52 includes a first reference voltage source 52a for outputting a reference voltage Vref1, a first operational amplifier 52b, and a first sample-hold circuit 52c. The primary coefficient feedback controlling circuit 53 has a substantially identical circuit construction to that of the constant feedback controlling circuit 52. Namely, this circuit 53 includes a second reference voltage source 53a for outputting a reference voltage Vref2, a second operational amplifier 53b and a second sample-hold circuit 53c. Incidentally, the circuit block diagram of FIG. 2 is provided for illustrating the operational concept of these circuits of the constant feedback controlling circuit 52 and the primary coefficient feedback controlling circuit 53. In fact, in addition to these basic circuits, there are provided other various circuits (not shown) for signal level adjustment or the like.

[Construction of LD Controller 55]

Next, the operation of the components including the constant feedback controlling circuit 52 under the control of the LD controller 55 will be described.

Figure 5:
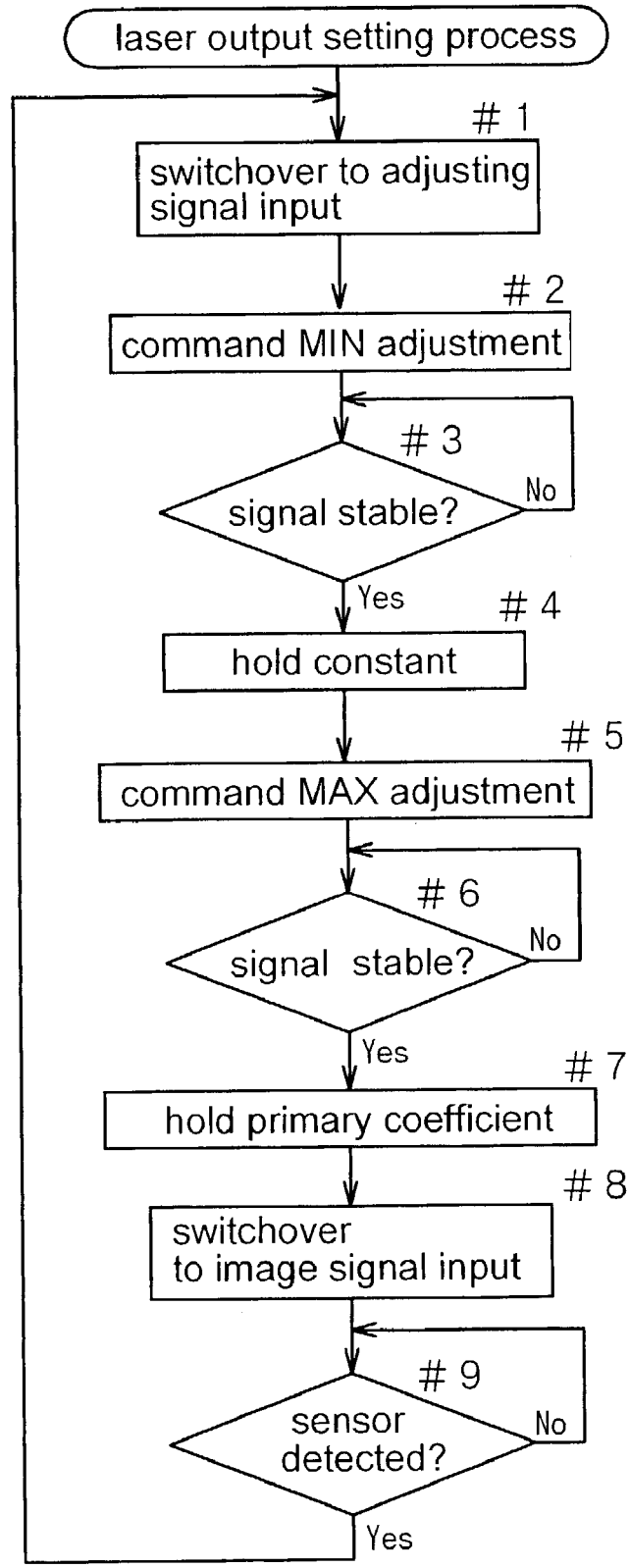
FIG. 5 is a flowchart relating to the image exposing apparatus relating to the one embodiment of the invention.

This LD controller 55 including a microprocessor constantly and repeatedly executes an operation illustrated in the flowchart of FIG. 5. According to this control scheme, upon activation, first, a switch 56 for selecting the input signal to the multiplier 50 is switched over such that 0 V signal outputted from the LD controller 55 is inputted to the X input of the multiplier circuit 50a, thereby a zero level signal (0V in this embodiment) is inputted to the adder circuit 50b (step #1) and command signals for setting the beam output from the semiconductor laser device 40 to become a beam output that corresponds to the minimum value of the input image signal are outputted respectively to the constant feedback controlling circuit 52 and the primary coefficient feedback controlling circuit 53 (step #2).

Specifically, the LD controller 55 releases the first sample-hold circuit 52c of the constant feedback controlling circuit 52 from its hold state thereby to allow the circuit to output the input voltage as it is (sample state). And, the controller 55 also maintains the second sample-hold circuit 53c of the primary coefficient feedback controlling circuit 53 at its hold state. With this, there is formed a feedback loop of the constant feedback controlling circuit 52 including the multiplier 50 and the laser unit 42. Incidentally, the B input of the adder circuit 50 receives, in addition, a high-frequency signal in the order of 300 MHz from the high-frequency oscillator circuit 51. In this regard, by incorporating a low-pass filter for cutting this high-frequency signal in the feedback loop or by using, as the photodiode 41, a diode of low frequency response, any adverse effect of the high-frequency signal may be eliminated. Alternatively, it is possible to de-energize the high-frequency oscillator circuit 51 at all during this setting process for the primary coefficient A and constant B.

The reference voltage Vref1 outputted from the first reference voltage source 52a of the constant feedback controlling circuit 52 is set to be equal to a value of voltage which is converted by the I/V converter circuit 54 from the minimum beam output from the photodiode 41 when it emits a laser beam of minimum beam intensity used by the semiconductor laser device 40 for exposure of the print paper 2. The constant feedback controlling circuit 52 varies the constant B at a high speed so as to cause the voltage inputted from the I/V converter circuit 54 to agree with the reference voltage Vref1.

The LD controller 55 monitors the output voltage of the first sample-hold circuit 52c. When the controller confirms that variation in the output voltage of the first sample-hold circuit 52c has diminished to a sufficient degree (step #3), the controller switches over the first sample-hold circuit 52c of the constant feedback controlling circuit 52 from its sample state to its hold state for holding then present input voltage and outputting it, thereby to determine the constant B (step #4). That is to say, the value of current Imin for obtaining the minimum beam output Pmin is obtained as the value for constant B and this value is inputted directly to the adder circuit 50b as a part (i.e. a term) of the correlation (equation: Y=A*X+B) between the input image signal and the driving current for the semiconductor laser device 40.

Next, the LD controller 55 outputs, to the constant feedback controlling circuit 52 and to the primary coefficient feedback controlling circuit 53, respectively, command signals for setting the beam output of the semiconductor laser device 40 corresponding to the input image signal of the beam output adjusting signal level (step #5).

Specifically, in the instant embodiment, the beam output adjusting signal level is set to the maximum value of the input image signal. Further, the signal inputted to the multiplier 50 from the exposure controller 14 has a level range of 0 to 1V. Therefore, the LD controller 55 input 1V signal to the X input of the multiplier 50 and maintains the first sample-hold circuit 52c of the constant feedback controlling circuit 42 at its hold state and also releases the second sample-hold circuit 53c of the primary coefficient feedback controlling circuit 53 from its hold state to the other state to allow direct output of the input voltage therefrom (sample state). With these, there is formed a feedback loop of the primary coefficient feedback controlling circuit 53 including the multiplier 50 and the laser unit 42.

The reference voltage Vref2 outputted from the second reference voltage source 53a of the primary coefficient feedback controlling circuit 53 is set to be equal to a value of voltage which is converted by the I/V converter circuit 54 from the output current from the photodiode 41 when the semiconductor laser device 40 emits a laser beam of maximum beam intensity (denoted by a mark Pmax in FIG. 6) used for exposure of the print paper 2. The primary coefficient feedback controlling circuit 53 varies the primary coefficient A at a high speed so as to cause the voltage inputted from the I/V converter circuit 54 to agree with the reference voltage Vref2.

The LD controller 55 monitors the output voltage of the second sample-hold circuit 53c. When the controller confirms that variation in the output voltage of the second sample-hold circuit 53c has diminished to a sufficient degree (step #6), the controller switches over the second sample-hold circuit 53c of the primary coefficient feedback controlling circuit 53 from its sample state to its hold state for holding then present input voltage and outputting it, thereby to determine the primary coefficient A (step #7). That is to say, the value of current Imax for obtaining the maximum beam output Pmax is obtained as the values of the previously set constant B and the newly set primary coefficient A and these values are inputted directly to the multiplier circuit 50a and the adder circuit 50b as the correlation (Y=A*X+B) between the input image signal and the driving current for the semiconductor laser device 40.

After the above-described setting of the constant B and the primary coefficient A, the switch 56 is now switched over to a condition for allowing the image signal from the exposure controller 14 to the X input of the multiplier circuit 50a (step #8).

Thereafter, based on the output signal of the beam sensor 19, with each occurrence of detection of the scanning position of the optical beam LB being located at a position other than the positions where the image is exposed and formed on the print paper 2, the steps #1 through #8 are effected for setting the primary coefficient A and the constant B.

That is to say, according to this embodiment, the period while the optical beam LB is scanning a position or an area outside the area where the print paper 2 can be located is effectively utilized for setting the primary coefficient A and the constant B for each exposure of one line amount of image signals.

[Construction of Exposure Controller 14]

Figure 1:
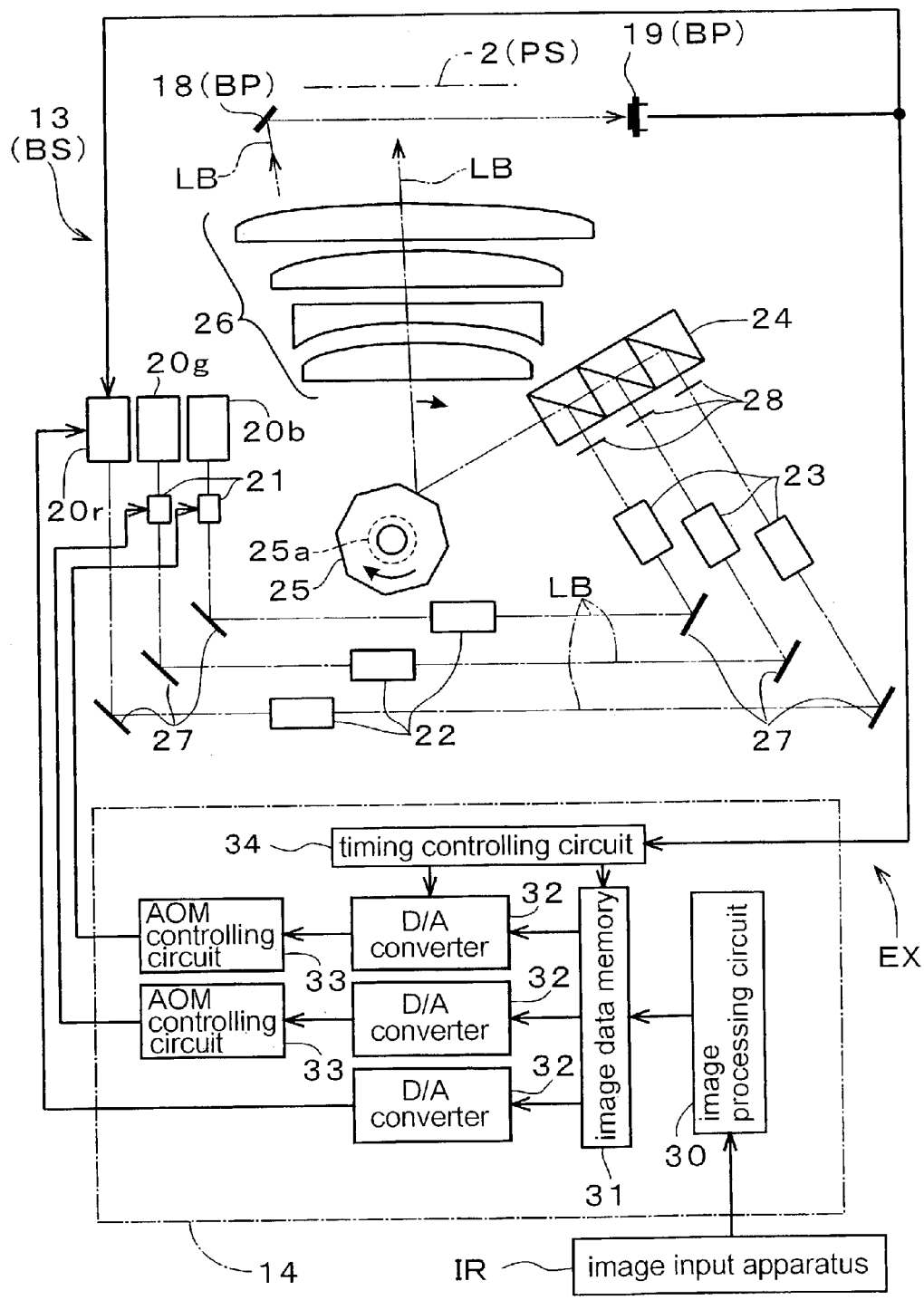
FIG. 1 is a schematic construction diagram showing an image exposing apparatus according one preferred embodiment of the present invention.

The exposure controller 14, as shown schematically in FIG. 1, includes, for controlling the image exposing unit 13, an image processing circuit 30 for adjusting and converting image data inputted from the image input apparatus IR into adjusted image data taking into consideration the exposure characteristics of the image exposing unit 13, an image data memory 31 for storing the image data obtained at the image processing circuit 30 for the respective colors of red, green and blue, D/A converters 32 provided for the respective colors of red, green and blue for effecting D/A conversion of the output data of each color from the image data memory 31, AOM controlling circuits 33 for outputting, to the respective AOM elements 21, control signals having amplitudes corresponding to the input signals from the respective D/A converters 32 for green and blue, and a timing controlling circuit 34 for controlling timings of transmitting the image signals from the respective D/A converters 32. As for the red color component, however, as described hereinbefore, this color component is subjected to the direct modulation of the semiconductor laser device 40. Hence, the output from the associated D/A converter 32 outputting an image signal in the range of 0V to 1V is inputted to the X input of the multiplier 50 of the red laser source 20r.

[Exposure Operaton by Image Exposing Apparatus EX]

Next, operations of the image exposing unit 13 and the exposure controller 14 will be described.

The image data for exposure inputted through the image input apparatus IR are adjusted and calculated at the image processing circuit 30 to be converted into adjusted image data which would provide quality print image when exposed by the image exposing unit 13, which data are then written sequentially into the image data memory 31.

These data temporarily stored at the image data memory 31 are transmitted therefrom for each data unit corresponding to a pixel to the respective D/A converters 32 in synchronism with clock signals from the timing controlling circuit 34, where the data are converted into analog signals. Thereafter, as for red image signals, these signals are transmitted to the multiplier 50 of the image exposing unit 13, whereas the green and blue image signals are transmitted to the respective AOM controlling circuits 33.

In the course of the above, the timing controlling circuit 34 sets the timing for transmitting the clock signal to e.g. the image data memory 31 based on the detection signal from the beam sensor 19.

Each AOM controlling circuit 33 outputs a control signal having an amplitude corresponding to the input signal to the AOM element 21 associated therewith. Then, the AOM element 21 modulates the laser beam from the green laser source 20a or the blue laser source 20b by a diffraction ratio corresponding to the amplitude of the inputted control signal.

On the other hand, the multiplier 50 which has received the image signal from the D/A converter 32 for the red component processes this image signal with the primary coefficient A and the constant B set in the above-described manner and directly modulates the semiconductor laser device 40.

In the above, the B input of the adder circuit 50b of the multiplier 50 is receiving additionally the high-frequency signal from the high-frequency oscillator circuit 51. Then, as illustrated in FIG. 6, by varying the constant B with this high-frequency signal, the high-frequency signal is superimposed on the driving current to be supplied to the semiconductor laser device 40. With this, the mode hopping phenomenon of the semiconductor laser device 40 is restricted, so that the laser device 50 outputs a beam LB which faithfully reflects the inputted image signal.

The laser beam LB of each color component modulated in the above-described manner then passes the beam expander 22 etc and enters the prism 24, where the three laser beams LB of red, green and blue are combined into a single laser beam LB, which is then reflected by the reflecting face of the polygonal mirror 25.

This beam LB reflected from the reflecting face of the polygonal mirror 25 which is being rotatably driven by the drive motor 25a is scanned within a plane normal to the rotational axis of the polygonal mirror 25 and converged by the focusing lens assembly 26 on the print paper 2 being transported. The scanning direction of the laser beam LB traverses (perpendicularly in this embodiment) the transporting direction of the print paper 2, with the scanning direction of the laser beam LB being a main scanning direction and the transporting direction of the print paper 2 being a sub scanning direction. With the scanning of the laser beam LB and the transporting of the print paper 2, an image to be printed is formed as a latent image on the print paper 2.

[Operation of the Photographic Printing System DP]

Next, a photographic printing operation by the photographic printing system DP having the above-described construction will be described briefly.

When an operator inputs a command for producing photographic prints based on frame images of a photographic film, the main controller 5 instructs the film scanner 3 to read the photographic film, so that the film scanner 3 reads the image data of this photographic film one after another and stores them in the memory incorporated therein.

On the other hand, if the operator inputs a command for producing photographic prints based on image data recorded on an electronic recording medium such as MO, CD-R or the like, the main controller 5 instructs a corresponding drive of the external input/output device 4 to read its electronically recorded data therefrom, so that the drive serially reads the image data and stores them in the memory.

Then, based on the image data inputted in the above-described manner, the main controller 5 proceeds to make, through calculation effected by its image processing circuit (not shown), a simulated image of the data which would be produced on the print paper 2 if the print were produced based on the image data under the currently set exposure conditions and displays this simulated image on the monitor 5a.

By observing this simulated image displayed on the monitor 5a, the operator may effect an input operation for correcting the exposure conditions from the control panel 5b, if the simulated image is judged inappropriate.

Then, in accordance with the inputted image data and also the correction instruction if any, the image processing circuit of the main controller 5 produces exposure image data for each color component of red, green and blue with predetermined calculation conditions.

These exposure image data are then transmitted to the exposure controller 14 of the exposing/developing apparatus EP and the data are subjected to correction calculation by the image processing circuit 30 of the exposure controller 14 and then serially written into the image data memory 31.

The timing controlling circuit 34, upon detecting that the leading end of the print paper 2 has arrived at a predetermined exposure start position based on the transport information of the print paper 2 obtained from the print paper transporting mechanism PT, serially transmits the image signals to the image exposing unit 13 at a speed corresponding to the exposing speed of this image exposing unit 13, in synchronism with the output signals from the beam sensor 19.

Then, the image exposing unit 13 forms a latent image of the print image to be obtained on the print paper 2 with the laser beam LB which has been modulated based on the received image signal.

The print paper 2 which has been exposed by the image exposing unit 13 is then transported by the print paper transporting mechanism PT to the developing device PP, in which the print paper is developed as passing respective developing tanks of the device. The resultant developed print paper 2 is then dried and discharged from the discharge opening 8 onto the conveyor and sorted by the sorter 7 for each customer's order.

[Other Embodiments]

Other embodiments of the invention will be described next.

(1) In the foregoing embodiment, the beam output controlling circuit 45 effects, in parallel, the measurement of the current-beam output characteristics of the semiconductor laser device 40 and the setting operation of the correlation between the received image signal of the laser driving circuit 44 and the driving current for the semiconductor laser device 40. Alternatively, it is also possible to drive the semiconductor laser device 40 with a plurality of steps of driving currents for determining beam outputs for the respective steps. Then, the current-beam output characteristics are obtained first. Thereafter, based on this measurement information, the primary coefficient A and the constant B may be obtained for determining the correlation between the input image signal and the driving current for the semiconductor laser device.

(2) In the foregoing embodiment, the constant feedback controlling circuit 52 and the primary coefficient feedback controlling circuit 53 are provided as separate circuits. Instead, as these controlling circuits have a common construction, it is also possible for e.g. a signal operational amplifier to share the first operational amplifier 52a and the second operational amplifier 53b.

(3) In the foregoing embodiment, the constant feedback controlling circuit 52 and the primary coefficient feedback controlling circuit 53 each includes an operational amplifier for effecting the feedback control. Instead, these circuits may each comprises e.g. a PLL circuit or include other arithmetic unit for effecting a high-speed arithmetic operation. In these manner, the specific construction of these feedback controlling circuits may vary in many ways.

(4) In the foregoing embodiment, for superimposing a high-frequency signal on the driving current for the semiconductor laser device 40, this is done by varying the constant B to be inputted to the adder circuit 50b. Instead, this may be done also by varying the primary coefficient to be inputted to the multiplier circuit 50a or by varying both of these. Further alternatively, it is also possible to add a high-frequency signal between the multiplier 50 and the semiconductor laser device 40, independently of the primary coefficient A or the constant B.

(5) In the foregoing embodiment, the high-frequency signal to be superimposed on the driving current for the semiconductor laser device 40 comprises a high-frequency signal of a fixed frequency. Instead, such signal may be applied by eliminating a low-frequency component which may affect the color development density on the print paper 2, from e.g. white noise or pink noise. Hence, the specific construction of the high-frequency signal may vary in many ways.

(6) In the foregoing embodiment, the setting operation of the primary coefficient A and the constant B is effected for exposure of one line amount of image signal. Instead, this operation may be effected for exposure of a plurality of lines of image signals or may be effected by a predetermined time interval. Hence, the timing of effecting this operation may vary in many ways.

(7) In the foregoing embodiment, the photosensitive material PS comprises the print paper 2. The present invention may be applied also other kinds of photosensitive materials or units such as a photosensitive film, a photosensitive drum, etc.

(8) In the foregoing embodiment, the construction of directly modulating the semiconductor laser device 40 is employed for the red exposing laser beam LB alone. The invention may be applied to the beams LB of other color components also.

(9) In the foregoing embodiment, the LD controller 55 effects the setting operation of the primary coefficient A and the constant B by applying the two steps of voltage, i.e. 0V and 1V to the X input of the multiplier circuit 50a only when the laser beam LB is scanning a position other than the area where the image is to be exposed. Alternatively, it is also possible to obtain the current-beam output characteristics of the semiconductor laser device 40 from the correlation between the inputted image signal and the output signal from the photodiode 41, when the beam LB is scanning a position within the image exposure area. Then, based on this measurement information, the controller may smoothly and continuously set the primary coefficient A and the constant B.

(10) In the foregoing embodiment, the optical sensor for detecting the laser output from the semiconductor laser device 40 comprises the photodiode 41 integrated in the laser unit 42. Instead, this laser sensor may be provided separately from the laser unit 42.

Though the invention has been described with respect to some specific embodiments, many variations and modifications will be apparent for those skilled in the art without departing from its scope defined in the appended claims. It is understood that such variations and modifications too are encompassed within the scope of the invention which is limited only by the claims.

What is claimed is:

1. An image exposing apparatus comprising:

beam scanning means for scanning a beam emitted from a semiconductor laser device to photosensitive material;

laser driving means for driving the semiconductor laser device, the laser driving means being operable to vary its driving current to the semiconductor laser device in accordance with a received image signal; and laser output controlling means operable to measure current-beam output characteristics of the semiconductor laser device over a predetermined current range and then set a correlation between said image signal for the laser driving means and the driving current for the semiconductor laser device, based on the measurement information;

wherein said laser driving means includes a multiplier circuit for multiplying an input value of the inputted image signal by a primary coefficient and an adder circuit for adding a constant to its product;

said laser output controlling means includes a constant feedback controlling circuit for varying said constant in such a manner as to cause the beam output from the semiconductor laser device to correspond to a zero level signal input to said adder circuit and a primary coefficient feedback controlling circuit for varying said primary coefficient in such a manner as to cause the beam output from the semiconductor laser device to become a beam output that corresponds to a beam output adjusting signal level input to said multiplier circuit; and wherein said laser output controlling means determines said constant by energizing said constant feedback controlling circuit when the input to said adder circuit is set to said zero level signal input and then determines said primary coefficient by energizing said primary coefficient feedback controlling circuit when the input to the multiplier circuit is set to the beam output adjusting signal level signal input, thereby to effect said measurement of the current-beam output characteristics of the semiconductor laser device in parallel with said setting operation of the correlation between the received image signal of the laser driving means and the driving current for the semiconductor laser device.

2. The image exposing apparatus according to claim 1, further comprising beam-position detecting means for detecting the beam being scanned at a predetermined position other than a position where the image is formed by exposure; and based on detection information from said beam-position detecting means, said laser output controlling means measures the current-beam output characteristics of the semiconductor laser device over the predetermined current range while the beam is scanning a position other than such position where the image is to be formed by exposure and then sets the correlation between said image signal received by the laser driving means and the driving current for the semiconductor laser device.

3. The image exposing apparatus according to claim 1, wherein the laser driving means superimposes a high-frequency signal on the driving current for the semiconductor laser device.

4. The image exposing apparatus according to claim 3, wherein the laser driving means superimposes said high-frequency signal by varying the primary coefficient to be inputted to the multiplier circuit or the constant to be inputted to the adder circuit.

5. An image exposing apparatus comprising:

beam scanning means for scanning a beam emitted from a semiconductor laser device to photosensitive material;

laser driving means for driving the semiconductor laser device, the laser driving means being operable to vary its driving current to the semiconductor laser device in accordance with a received image signal; and laser output controlling means operable to measure current-beam output characteristics of the semiconductor laser device over a predetermined current range and then set a correlation between said image signal for the laser driving means and the driving current for the semiconductor laser device, based on the measurement information;

wherein said laser driving means includes a multiplier circuit for multiplying an input value of the inputted image signal by a primary coefficient and an adder circuit for adding a constant to its product; and wherein the laser driving means superimposes said high-frequency signal by varying the primary coefficient to be inputted to the multiplier circuit or the constant to be inputted to the adder circuit.

6. The image exposing apparatus according to claim 5, further comprising beam-position detecting means for detecting the beam being scanned at a predetermined position other than a position where the image is formed by exposure; and wherein based on detection information from said beam-position detecting means, said laser output controlling means measures the current-beam output characteristics of the semiconductor laser device over the predetermined current range while the beam is scanned at the predetermined position other than such position where the image is to be formed by exposure and then sets the correlation between said image signal received by the laser driving means and the driving current for the semiconductor laser device.

7. An image exposing apparatus comprising:

beam scanning means for scanning a beam emitted from a semiconductor laser device to photosensitive material;

laser driving means for driving the semiconductor laser device, the laser driving means being operable to vary its driving current to the semiconductor laser device in accordance with a received image signal; and laser output controlling means operable to measure current-beam output characteristics of the semiconductor laser device over a predetermined current range and then set a correlation between said image signal for the laser driving means and the driving current for the semiconductor laser device, based on the measurement information;

wherein said apparatus further comprises beam-position detecting means for detecting the beam being scanned at a predetermined position other than a position where the image is formed by exposure; and wherein, based on detection information from said beam-position detecting means, said laser output controlling means measures the current-beam output characteristics of the semiconductor laser device over the predetermined current range for a plurality of current values while the beam is scanned at the predetermined position other than such position where the image is to be formed by exposure and then sets the correlation between said image signal received by the laser driving means and the driving current for the semiconductor laser device;

wherein said laser driving means includes a multiplier circuit for multiplying an input value of the inputted image signal by a primary coefficient and an adder circuit for adding a constant to its product;

wherein said laser output controlling means includes a constant feedback controlling circuit for varying said constant in such a manner as to cause the beam output from the semiconductor laser device to correspond to a zero level signal input to said adder circuit and a primary coefficient feedback controlling circuit for varying said primary coefficient in such a manner as to cause the beam output from the semiconductor laser device to become a beam output that corresponds to a beam output adjusting signal level input to said multiplier circuit; and wherein said laser output controlling means determines said constant by energizing said constant feedback controlling circuit when the input to said adder circuit is set to said zero level signal input and then determines said primary coefficient by energizing said primary coefficient feedback controlling circuit when the input to the multiplier circuit is set to the beam output adjusting signal level signal input, thereby to effect said measurement of the current beam output characteristics of the semiconductor laser device in parallel with said setting operation of the correlation between the received image signal of the laser drying means and the driving current of the semiconductor laser device.

8. An image exposing apparatus comprising:

beam scanning means for scanning a beam emitted from a semiconductor laser device to photosensitive material;

laser driving means for driving the semiconductor laser device, the laser driving means being operable to vary its driving current to the semiconductor laser device in accordance with a received image signal; and laser output controlling means operable to measure current-beam output characteristics of the semiconductor laser device over a predetermined current range and then set a correlation between said image signal for the laser driving means and the driving current for the semiconductor laser device, based on the measurement information;

wherein said apparatus further comprises beam-position detecting means for detecting the beam being scanned, at a predetermined position other than a position where the image is formed by exposure;

wherein based on detection information from said beam-position detecting means, said laser output controlling means measures the current-beam output characteristics of the semiconductor laser device over the predetermined current range for a plurality of current values while the beam is scanned at the predetermined position other than such position where the image is to be formed by exposure and then sets the correlation between said image signal received by the laser driving means and the driving current for the semiconductor laser device; and wherein the laser driving means superimposes a high-frequency signal on the driving current for the semiconductor laser device by varying the primary coefficient to be inputted to the multiplier circuit or the constant to be inputted to the adder circuit.

* * * * *